United States Patent
Shin

(10) Patent No.: US 11,792,597 B2
(45) Date of Patent: Oct. 17, 2023

(54) GAZE-BASED AUDIO BEAMFORMING

(71) Applicant: GOOGLE LLC, Mountain View, CA (US)

(72) Inventor: Dongeek Shin, Santa Clara, CA (US)

(73) Assignee: GOOGLE LLC, Mountain View, CA (US)

( * ) Notice: Subject to any disclaimer, the term of this patent is extended or adjusted under 35 U.S.C. 154(b) by 141 days.

(21) Appl. No.: 17/456,007

(22) Filed: Nov. 22, 2021

(65) Prior Publication Data
US 2023/0164508 A1     May 25, 2023

(51) Int. Cl.
*H04S 7/00* (2006.01)
*G06T 7/70* (2017.01)
*G06F 3/01* (2006.01)
*H04R 1/40* (2006.01)

(52) U.S. Cl.
CPC .............. *H04S 7/303* (2013.01); *G06F 3/013* (2013.01); *G06T 7/70* (2017.01); *H04R 1/406* (2013.01); *G06T 2207/30201* (2013.01)

(58) Field of Classification Search
CPC . H04S 7/303; G06T 7/70; G06T 2207/30201; G06F 3/103; H04R 1/406
See application file for complete search history.

(56) References Cited

U.S. PATENT DOCUMENTS

| | | |
|---|---|---|
| 10,555,106 B1 | 2/2020 | Mehra |
| 11,096,006 B1 * | 8/2021 | Robinson ............ G10L 21/0232 |
| 2011/0058677 A1 | 3/2011 | Choi et al. |
| 2016/0080874 A1 | 3/2016 | Fullam |
| 2017/0277257 A1 | 9/2017 | Ota et al. |
| 2017/0372487 A1 | 12/2017 | Lagun et al. |
| 2020/0097075 A1 | 3/2020 | Tokubo |
| 2021/0258709 A1 | 8/2021 | Jang et al. |

OTHER PUBLICATIONS

Adel, Hidri , et al., "Beamforming Techniques for Multichannel Audio Signal Separation", 9 pages.
International Search Report and Written Opinion for PCT Application No. PCT/US2022/080027, dated Feb. 17, 2023, 15 pages.

* cited by examiner

*Primary Examiner* — Andrew L Sniezek
(74) *Attorney, Agent, or Firm* — Brake Hughes Bellermann LLP

(57) ABSTRACT

Beamforming can improve the audio quality and/or intensity in a particular direction, which can help a user hear, especially in certain environments. Augmented reality glasses can track the eye, or eyes, of a user which can trigger and guide the beamforming towards a particular object of interest, such as a person speaking. The beamforming may be made efficient by storing information necessary for beamforming in a database and recalling the information at runtime.

21 Claims, 12 Drawing Sheets

GAZE-BASED AUDIO BEAMFORMING

FIELD OF THE DISCLOSURE

The present disclosure relates to augmented reality and more specifically to an augmented reality device configured to process audio based on eye tracking.

BACKGROUND

Head-worn computing devices (e.g., smart glasses) may be configured with a variety of sensors to enable augmented reality (AR), in which virtual elements are presented with real elements of an environment. The virtual elements may be presented on a heads-up display so they appear as if they were located in the real world. The heads-up display can be implemented in devices resembling eyeglasses (i.e., AR glasses).

AR glasses may be configured with eye tracking sensor(s) to determine directions and/or points of a gaze of the user as it changes with time. AR glasses may also be configured with a plurality of microphones that operate as a microphone array with a sensitivity pattern that has a beam so that sounds from the direction of the beam are received with the highest sensitivity of the microphone array. Audio from the microphone array may be processed so that the beam may be steered in different directions (i.e., beamforming).

SUMMARY

In at least one aspect, the present disclosure generally describes a method. The method includes receiving audio channels from a plurality of microphones that are configured to operate as a microphone array of an augmented reality (AR) device. The method further includes tracking an eye of a user of the AR device to determine a gaze direction of the user. The method further includes selecting a beam pattern for the microphone array from a set of stored beam patterns based on the gaze direction of the user. The method further includes generating a beamformed audio signal based on the selected beam pattern and transmitting the beamformed audio signal to speakers of the AR device for playing the beamformed audio signal to the user.

In another aspect, the present disclosure generally describes smart glasses. The smart glasses include a microphone array having microphones configured to generate channels of audio based on sounds from an environment. The smart glasses further include an eye tracker configured to determine a gaze direction of a user. The smart glasses further include speakers and a processor. The processor is configured by software to receive the channels of audio from the microphone array and to receive the gaze direction from the eye tracker. The processor is further configured to retrieve weights for the channels of audio from a look-up table based on the gaze direction. The processor is further configured to apply the weights to the channels and sum the channels to generate a beamformed audio signal that amplifies sounds in the environment from the gaze direction. The processor is further configured to transmit the beamformed audio signal to the speakers for playing to the user.

The foregoing illustrative summary, as well as other exemplary objectives and/or advantages of the disclosure, and the manner in which the same are accomplished, are further explained within the following detailed description and its accompanying drawings.

BRIEF DESCRIPTION OF THE DRAWINGS

The components in the drawings are not necessarily to scale relative to each other. Like reference numerals designate corresponding parts throughout the several views.

DETAILED DESCRIPTION

Figure 1:
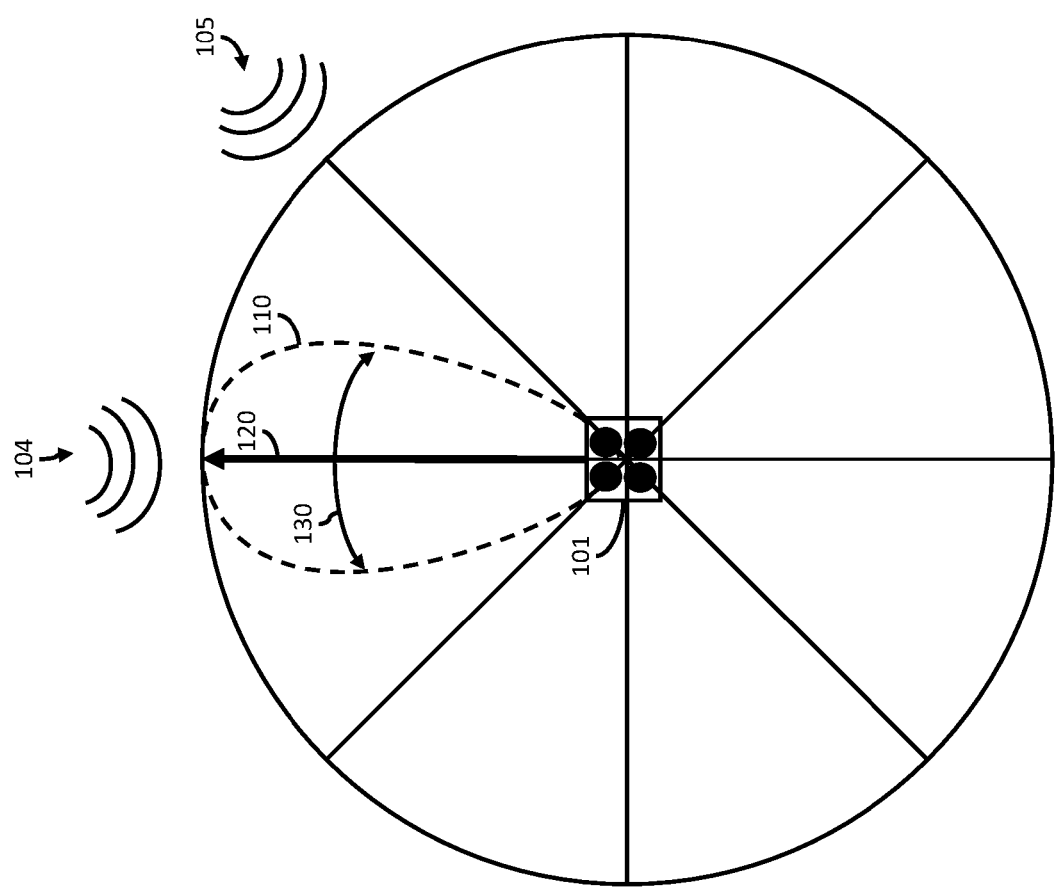
FIG. 1 is a sensitivity plot of a microphone array after beamforming according to a possible implementation of the present disclosure.

The present disclosure describes audio-beamforming (i.e., beamforming) of a microphone array on smart glasses (e.g., AR glasses) that is based, at least in part, on a position (or positions) of the eye (or eyes) of the user (i.e., eye-tracked beamforming). A technical problem with eye-tracked beamforming is related to the demand it places on the power/processing resources of the AR glasses. To be effective, the eye-tracking and beamforming must be responsive (i.e., to avoid a noticeable latency) without consuming too much power (i.e., to extend battery life). The present disclosure provides systems and methods for eye-tracked beamforming based on an approach that reduces complexity to increase processing/power efficiency. The disclosed approach may have the technical effect of automatically enhancing signals in the direction of the user's gaze without significantly affecting the battery life or processing resources of the AR glasses.

The power/processing efficiency of the disclosed eye-tracked beamforming approach may result from a few different aspects. First, the disclosed eye-tracked beamforming can rely, at least in part, on stored beam patterns, which can be retrieved and applied based on a gaze of the user. Second, the eye-tracked beamforming may be configured to activate/deactivate in certain conditions so that it is not always operational.

The technical effect of the disclosed eye-tracked beamforming approach may allow for new audio applications. For example, the present disclosure further describes an implementation in which the audio beamforming can be zoomed-in or zoomed-out in a gaze direction to improve the audio experience for the user.

Beamforming (i.e., beam steering) is a signal processing technique in which multiple channels of audio can be processed (e.g., filtered, delayed, phase shifted) to generate a beamformed audio signal in which audio from different directions may be enhanced (i.e., amplified) or diminished (i.e., attenuated). For example, a first microphone and a second microphone can be spatially separated by a distance along an array direction. The spatial separation distance and the direction of the sound (relative to the array direction) can introduce an interaural delay between a first audio stream at the first microphone and a second audio stream at the second microphone. Beamforming can include further delaying one of the audio streams by a beamforming delay so that after beamforming, the first audio stream and the second audio stream are phase shifted by the interaural delay and the beamforming delay. The phase shifted audio streams are then combined (e.g., summed) to produce beamformed audio. By adjusting the beamforming delay with respect to the interaural delay, audio from a particular direction may be adjusted (e.g., cancelled, attenuated, enhanced) by the summing process. For example, a pure sine wave received by the first microphone and the second microphone can be canceled completely for a particular direction if, after the interaural delay and the beamforming delay, the versions of the sine wave at the combiner are 180 degrees out of phase. Alternatively, the versions of the sine wave at the combiner can be enhanced if after the interaural delay and the beamforming delay, the versions of the sine wave at the combiner are in phase (i.e., 0 degrees out of phase).

The multiple channels of audio can be captured (i.e., collected) by an array of microphones (i.e., microphone array). Each microphone in the microphone array can be of the same type or different types. For example, all microphones in the microphone array may be omnidirectional. The microphones may be spaced apart (e.g., equally spaced) in one, two, or three dimensions. A microphone array having one dimension may be capable of beam steering in the one dimension, while a microphone array in two-dimensions may be capable of beam steering in either, or both, of the two dimensions. The number and spacing of the microphones in the microphone array can correspond to a beam width (i.e., directivity, focus, angular extent) of the beam.

FIG. 1 illustrates a polar plot of the sensitivity of a microphone array 101 after beamforming. The pattern of the sensitivity is known as the "beam pattern" of the microphone array. The beam pattern of the microphone array has a beam 110 with a maximum sensitivity in a beam direction 120 and spans a beam width 130 at a particular sensitivity (e.g., −3 decibels (dB)) on either side of the beam direction 120. Beamformed audio resulting from the beam pattern will enhance (e.g., amplify) sounds from sources in the beam direction 120 and will suppress (e.g., attenuate) sounds from sources not in the beam direction. In other words, a first sound 104 from a direction aligned with beam direction 120 will sound louder to a listener than a second sound 105 from a direction that is not aligned with the beam direction 120.

The spatially selective enhancement/suppression resulting from beamforming may help a user to distinguish the speech-audio (e.g., in a noisy environment). Additionally (or alternatively), the beamforming may improve an accuracy of other computer-aided speech applications (e.g., voice recognition, voice-to-text (VTT), language translation, etc.). Additionally, the beamforming may increase privacy because other-audio (e.g., bystander conversation) received from a direction other than the speech-direction can be amplified much less than the speech-audio. The versatility of these applications can be improved by controlling the beamforming based on the intent of the listener, which can be determined by tracking the eyes of the listener.

Eye tracked beamforming includes adjusting the processing (e.g., filtering, delaying, phase shifting) of the multiple channels of audio from a microphone array according to an eye (or eyes) of a user in order to generate a beam in a beam direction that is approximately aligned (e.g., exactly aligned) with a gaze of the user. The gaze of the user may include a direction (i.e., gaze direction) in which the user is looking. Determining the gaze direction (e.g., gaze(θ), gaze (ϕ,θ)) may include determining a gaze point (e.g., gaze(x,y)) in a field-of-view at which the user is looking.

A gaze can be determined by tracking an eye (or eyes) of a user. One possible method for eye tracking includes measuring eye metrics using cameras to determine a position of the eye. In one possible implementation a pupil position may be measured relative to a pattern of light (near infra-red light) projected onto the eye by analyzing a high-resolution image of the eye and the pattern. Then, the position of the eye may be applied to machine learning models to determine a gaze point. Variations to this method that do not use the projected pattern are possible. For example, there are standard glint based tracking or convolutional neural net approaches that can convert a two-dimensional (2D) infrared image captured by a camera pointed at the eye (or a reflected eye image from a mirror) into an coordinate (x,y) in a field-of-view of AR glasses, such as shown in FIG. 2.

Figure 2:
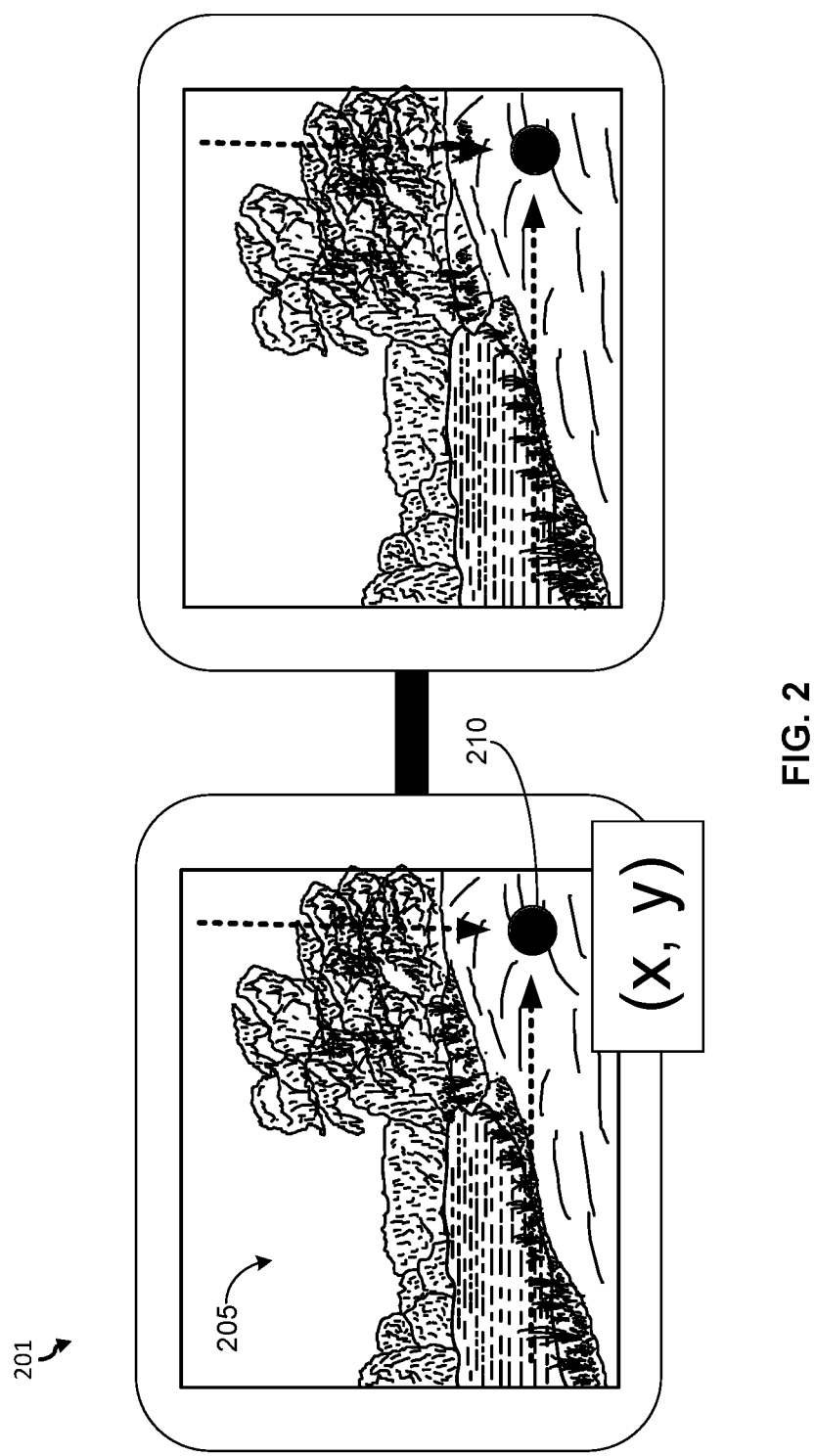
FIG. 2 illustrates a field of view through AR glasses including measured gaze points according to a possible implementation of the present disclosure.

FIG. 2 illustrates a field-of-view 205 through AR glasses 201 including measured gaze point 210. The gaze point may correspond to a gaze direction relative to the AR glasses. A gaze point that remains fixed for a particular period of time may indicate that the user is interested in a corresponding area of the field of view. This interest may trigger beamforming in a gaze direction corresponding to the gaze point. For example, a gaze direction may be based on a projection, relative to a coordinate system of the AR glasses, that intersects the gaze point at a surface in the field of view.

Figure 3B:
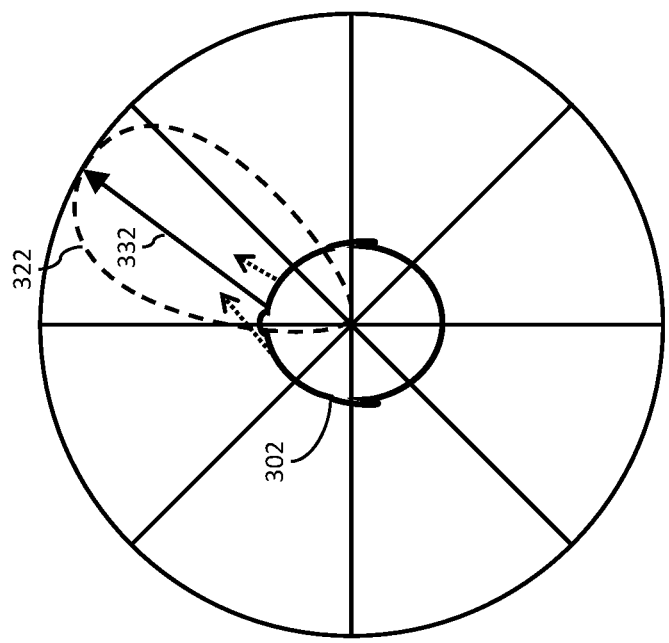
FIGS. 3A and 3B illustrate beamforming based on gaze directions according to implementations of the present disclosure.
Figure 3A:
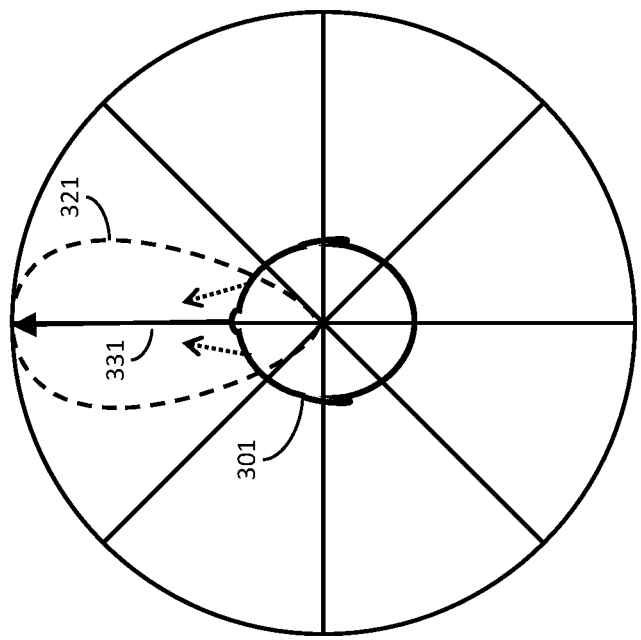

FIGS. 3A and 3B illustrate beamforming based on a gaze direction. The gaze direction may be determined based on the positions of the user's eyes, as shown by dotted arrows. FIG. 3A illustrates a first beam pattern 321 aligned with a first gaze direction 331 of a user 301 and FIG. 3B illustrates a second beam pattern 322 that is aligned with a second gaze direction 332 of a user 302. The gaze of the user may change with time. Accordingly, the first beam pattern 321 may be used at a first time and the second beam pattern 322 may be used at a second time. The gaze of the user may or may not be associated with a head position of the user. In some implementations the user's head position and the gaze direction can be combined when determining the beam direction.

Figure 4:
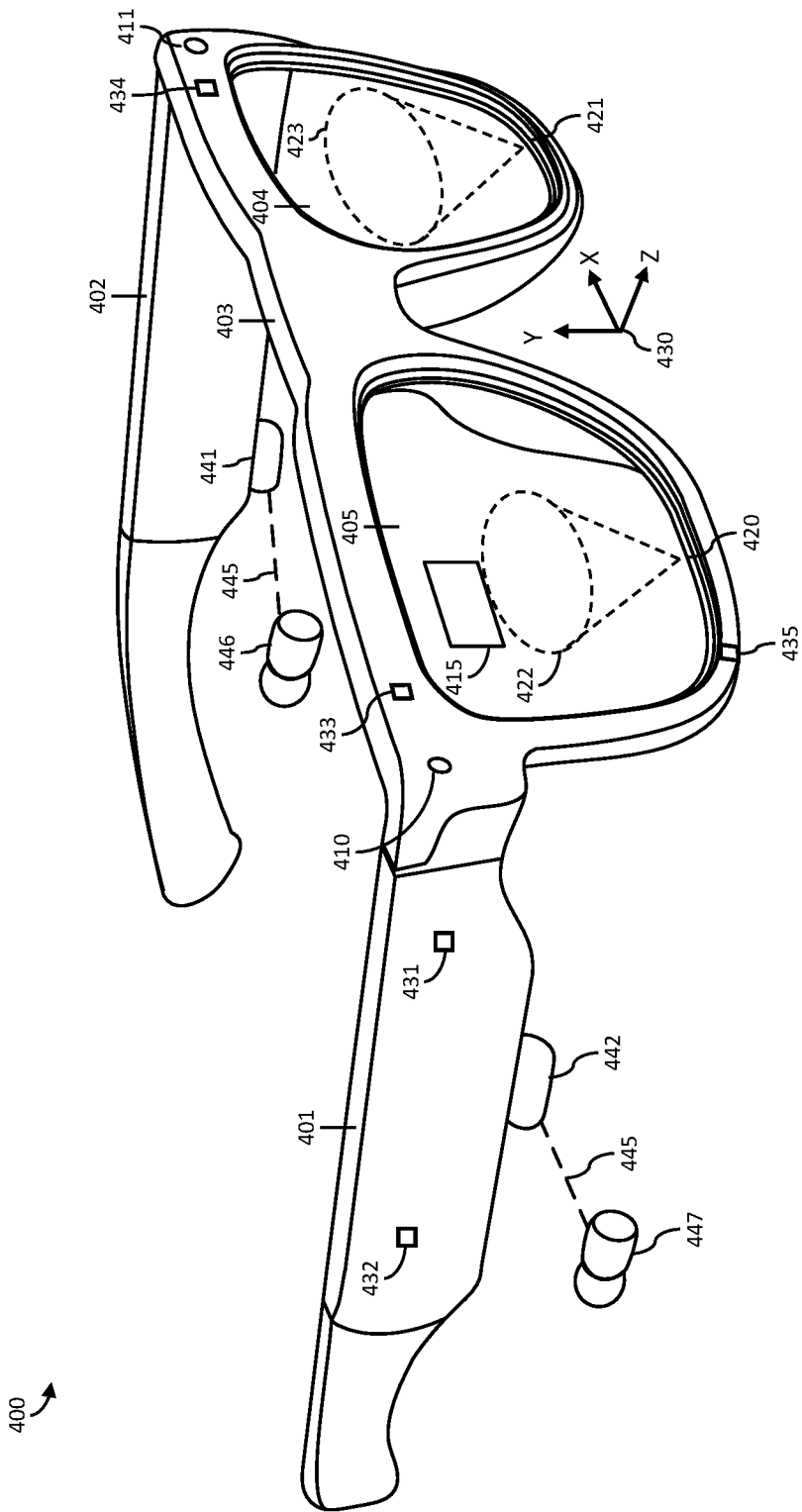
FIG. 4 is a perspective view of AR glasses according to a possible implementation of the present disclosure.

FIG. 4 is a perspective view of AR glasses according to a possible implementation of the present disclosure. The AR glasses 400 are configured to be worn on a head and a face of a user. The AR glasses 400 include a right earpiece 401 and a left earpiece 402 that are supported by the ears of a user. The AR glasses further include a bridge portion 403 that is supported by the nose of the user so that a left lens 404 and a right lens 405 can be positioned in front a left eye of the user and a right eye of the user respectively. The portions of the AR glasses can be collectively referred to as the frame of the AR glasses. The frame of the AR glasses can contain electronics to enable function. For example, the frame may include a battery, a processor, a memory (e.g., non-transitory computer readable medium), and electronics to support sensors (e.g., cameras, depth sensors, etc.), and interface devices (e.g., speakers, display, network adapter, etc.).

The AR glasses 400 can include a FOV camera 410 (e.g., RGB camera) that is directed to a camera field-of-view that overlaps with the natural field-of-view of the user's eyes when the glasses are worn. In a possible implementation, the AR glasses can further include a depth sensor 411 (e.g., LIDAR, structured light, time-of-flight, depth camera) that is directed to a depth-sensor field-of-view that overlaps with the natural field-of-view of the user's eyes when the glasses are worn. Data from the depth sensor 411 and/or the FOV camera 410 can be used to measure depths in a field-of-view (i.e., region of interest) of the user (i.e., wearer). In a possible implementation, the camera field-of-view and the depth-sensor field-of-view may be calibrated so that depths (i.e., ranges) of objects in images from the FOV camera 410 can be determined, where the depths are measured between the objects and the AR glasses.

The AR glasses 400 can further include a display 415. The display may present AR data (e.g., images, graphics, text, icons, etc.) on a portion of a lens (or lenses) of the AR glasses so that a user may view the AR data as the user looks through a lens of the AR glasses. In this way, the AR data can overlap with the user's view of the environment.

The AR glasses 400 can further include an eye-tracking sensor. The eye tracking sensor can include a right-eye camera 420 and a left-eye camera 421. The right-eye camera 420 and the left-eye camera 421 can be located in lens portions of the frame so that a right FOV 422 of the right-eye camera includes the right eye of the user and a left FOV 423 of the left-eye camera includes the left eye of the user when the AR glasses are worn. A gaze point (x,y) can be determined at a frequency of the camera (e.g., right-eye camera 420, left-eye camera 421) video feed. For example, the gaze point coordinates (x,y) may be measured at the camera's frame rate (e.g., 15 frames-per-second) or less.

The AR glasses 400 can further include a plurality of microphones (i.e., 2 or more microphones). The plurality of microphones can be spaced apart on the frames of the AR glasses. As shown in FIG. 4, the plurality of microphones can include a first microphone 431, a second microphone 432, a third microphone 433, a fourth microphone 434, and a fifth microphone 435. The plurality of microphones may be configured to operate together as a microphone array that has a beam directed in a particular direction relative to a coordinate system 430 of the AR glasses 400. Alternatively, the microphones may be configured to operate in groups (i.e., sub-arrays), where each group is configured to operate as a microphone array. In one example, the third microphone 433 and the fourth microphone 434 may be configured to operate as a (horizontal) microphone array aligned with a X-direction of the coordinate system 430 of the AR glasses 400. In other words, the third microphone 433 and the fourth microphone 434 may be used for horizontal beamforming. Further, the third microphone 433 and the fifth microphone 435 may be configured to operate as a (vertical) microphone array in the Y-direction of the coordinate system 430 of the AR glasses 400. In other words, the third microphone 433 and the fifth microphone 435 may be used for vertical beamforming. Further, the first microphone 431 and the second microphone 432 may be configured to operate as a (horizontal) microphone array in the Z-direction of the coordinate system 430 of the AR glasses 400. The number of microphones used for each sub-array may be two or more. Increasing a number of microphones in a sub-array can narrow the beam width of the beam pattern resulting from the sub-array. Two or more sub-arrays may share one or more microphones because the beamforming process for the sub-arrays may be parallelized.

The AR glasses 400 may further include a left speaker 441 and a right speaker 442 configured to transmit audio (e.g., beamformed audio) to the user. Additionally, or alternatively, transmitting audio to a user may include transmitting the audio over a wireless communication link 445 to a listening device (e.g., hearing aid, earbud, etc.). For example, the AR glasses may transmit audio (e.g., beamformed audio) to a left wireless earbud 446 and to a right earbud 447. When the beamform audio tracks the gaze point (x,y) of the user, then sounds in the audio from an area of the field-of-view that includes the gaze point may be amplified while sounds from other areas of the field-of-view may be not amplified or attenuated.

Figure 5:
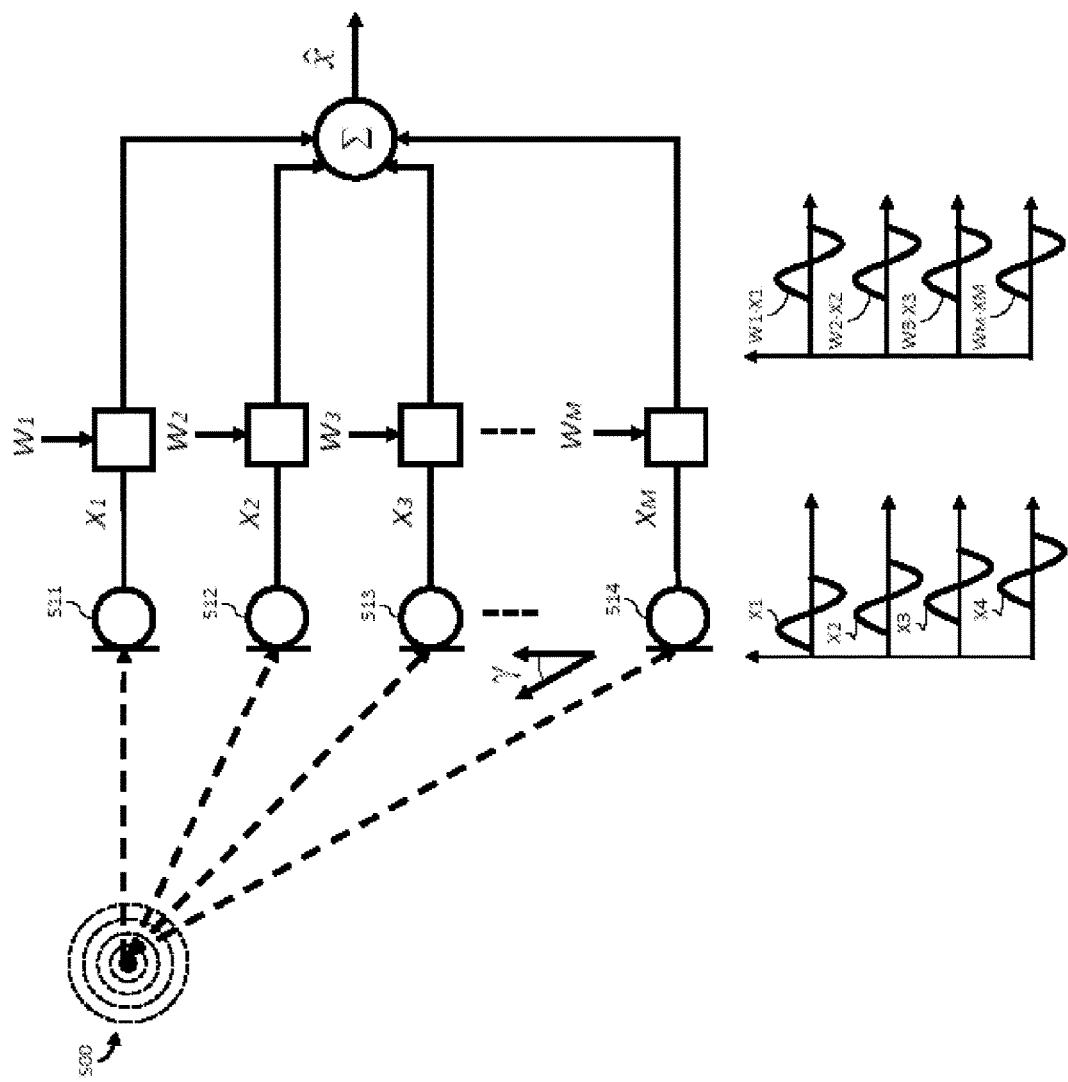
FIG. 5 illustrates a beamforming process according to a possible implementation of the present disclosure.

FIG. 5 illustrates a beamforming process according to a possible implementation of the present disclosure. The process includes receiving audio at a plurality of microphones. For example, a first microphone 511, a second microphone 512, a third microphone 513, and a fourth microphone 514. The microphones may respectively receive a first audio signal ($x_1$), a second audio signal ($x_2$), a third audio signal ($x_3$), and a fourth audio signal ($x_M$) that are out of phase (in time) due to a spatial relationship between each microphone and a sound source 500 that is different. As shown, the sound source 500 is at an angle ($\gamma$) with the microphone array. The process further includes applying (e.g., multiplying) a first weight ($w_1$) to the first audio signal ($x_1$), a second weight ($w_2$) to the second audio signal ($x_2$) a third weight to the third audio signal (x3) and a fourth weight ($w_m$) to the fourth audio signal ($x_m$). Each weight may be complex so that applying a weight (w) having an amplitude (a) and phase ($\theta$) (e.g., $w = a \cdot e^{-j\theta}$) can change the amplitude/phase of the respective audio signal. As shown, the weights can be applied to each audio channel to bring them in phase. After applying the weights, the channels can be summed ($\Sigma$) to produce beamformed audio ($\hat{x}$). The summing of the in-phase channels effectively amplifies the audio in the direction (i.e., at the angle ($\gamma$)) of the sound source 500 relative to the direction of the microphone array. The beamforming process is generalized for a microphone array with a number (M) of microphones in the equation below.

$$\hat{x} = \Sigma_{i=1}^{M} w_i \cdot x_i = \Sigma_{i=1}^{M} (a_i \cdot e^{-j\pi\theta_i}) \cdot x_i \qquad (1)$$

The beamforming may be parallelized by orientation so that an array that is horizontally arranged with respect to a coordinate system (i.e., a horizontal array) has a first set of weights, while an array that is vertically arrange with respect to the coordinate system (i.e., a vertical array) has a second set of weights. The audio from the array in each direction may be processed independently to produce horizontal beamformed signal and vertical beamformed signal. The horizontal beamformed signal and the vertical beamformed signal can be averaged to form a in a direction that includes a horizontal component (e.g., x) and a vertical component (e.g., y). This parallel processing approach may have an advantage of simplicity, but other approaches may be possible. For example, it may be possible to determine weights for beamforming in both horizontal and vertical directions so that the added averaging step is unnecessary. Further, three-dimensional (3D) beamforming may be possible by adding a third dimension (e.g., z) to the steps described above.

Figure 6A:
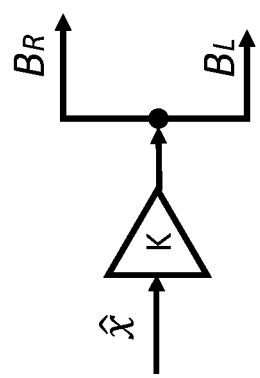
FIGS. 6A and 6B illustrate possible processing of beamformed audio according to implementations of the present disclosure.

The beamform audio may be further processed ($\hat{x}$) (i.e., post processed) for presentation to a user. FIG. 6A illustrates a first possible post-processing of the beamformed audio ($\hat{x}$). The beamformed audio is applied to an amplifier/attenuator to adjust the amplitude of the beamformed audio before it is split to a left beamformed channel ($B_L$) and a right beamformed channel ($B_R$) for a user. For example, the gain of the amplifier may be 1/M so that the amplitude of the beamformed audio after combining M channels is the same as it was before combining.

Figure 6B:
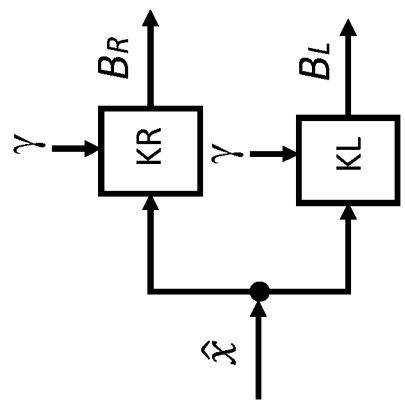

FIG. 6B illustrates a second possible post-processing of the beamformed audio ($\hat{x}$). The beamformed audio is split into a right channel and a left channel. A right weight ($K_R$) is applied to the right channel and a left weight ($K_L$) is applied to a left channel. The result of the weighting provides a beamformed right channel ($B_R$) and a beamformed left channel ($B_L$). For example, the weighting may produce a delay between the left and right channels (i.e., interaural delay) so that the beamformed audio sounds to a user as it is arriving to a user's ears from a particular direction. In a possible implementation the right weight and the left weight may be controlled by direction of the beamforming. For example, when the beamforming corresponds to a direction ($\gamma$) of the sound source, as shown in FIG. 5, the beamformed audio ($\hat{x}$) can be weighted so that it is played in stereo to the ears of the user and sounds as if it arrived from the direction ($\gamma$) of the sound source.

Figure 7:
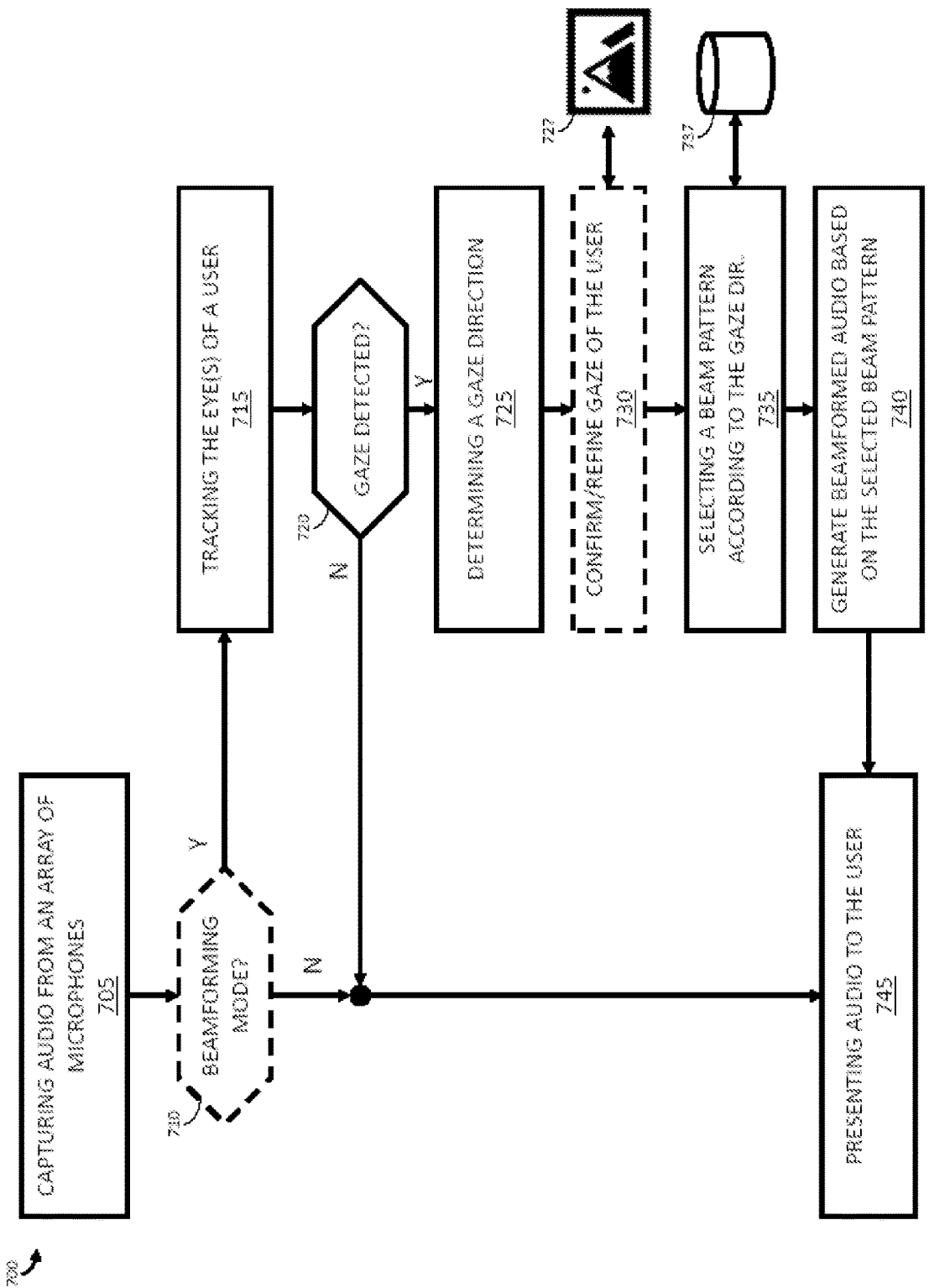
FIG. 7 is a flowchart of a method for eye-tracked audio beamforming according to an implementation of the present disclosure.

FIG. 7 is a flowchart of a method for eye-tracked audio beamforming according to an implementation of the present disclosure. The method 700 may be implemented as a computer program product that is tangibly embodied on a non-transitory computer-readable medium. In other words, steps of the method 700 may be included as part of a computer program (i.e., module, software, applications, code) that can be implemented in a programming language or machine language. When executed, the computer program can configure at least one processor to perform the method for eye-tracked audio beamforming.

The method 700 for eye-tracked audio beamforming includes capturing 705 audio from a plurality of microphones (i.e., microphone array). In a possible implementation, each microphone in the microphone array has an omnidirectional sensitivity pattern. In another possible implementation, one or more of the microphones in the microphone array have a directional sensitivity pattern.

The microphones may be integrated with AR glasses. In a possible implementation, the AR glasses can be configured in a beamforming mode (i.e., beamforming) or a normal mode (i.e., no beamforming). In a beamforming mode, the audio from the microphone array can be processed to steer the sensitivity of the microphone array in a direction corresponding to a gaze of the user. The choice of modes may depend on a variety of factors. For example, beamforming or not beamforming may be based on the processing and power resources available to the AR glasses. In particular, eye tracking may be avoided when the AR glasses are in a low power mode (e.g., power level less than 25%). Accordingly, the method 700 can optionally include determining if the device is in a beamforming mode 710. When the AR device is not in the beamforming mode, audio from one or more of the microphones may be presented 745 to a user. When the AR glasses are in the beamforming mode, however, steps may be taken to perform the eye-tracked audio beamforming. In some implementations, the AR glasses are configured to automatically beamform the audio when a gaze of the user meets a criterion (or criteria). In these implementations, the step of determining if the device is in a beamforming mode 710 may be omitted.

The method 700 includes tracking 715 the eye, or eyes, of the user. The results of the eye tracking can be used to detect 720 a gaze. If a gaze is detected, then the audio may be beamformed and presented to a user as beamformed audio, otherwise the audio may be presented 745 to a user without beamforming. Details for determining when to beamform and when to not beamform based on a gaze will be discussed further below (e.g., see FIG. 11).

After detecting a gaze, a gaze direction may be determined 725. As described previously (e.g., FIG. 2), determining a gaze of the user may include determining a gaze point from a measured position of one or both eyes. The positions may be measured from images captured of the eye (or eyes). In some implementations, the method may further include gathering additional information to help confirm and/or refine 730 (i.e., adjust) the gaze direction. For example, an image 727 of the field of view of the user may be captured and analyzed in the determined gaze direction. The analysis may include searching for known sound sources in the image 727. For example, if a person speaking is located in the gaze direction then the gaze direction may be confirmed as towards the person speaking. If the person speaking is in a direction that is close (e.g., within ±10 degrees) to the determined gaze direction but not exactly aligned with the gaze direction, then an adjustment may be made to align the gaze direction with the person speaking.

After a gaze direction is determined, the method 700 includes selecting 735 a beam pattern according to the gaze direction. The beam pattern may be selected from a plurality of beam patterns stored in a memory. The memory may be local memory of the AR glasses or may be memory available on a network that is communicatively coupled to the AR glasses. For example, the beam patterns may be stored in a look up table or database 737 that can be queried using (at least) the gaze direction.

Figure 8:
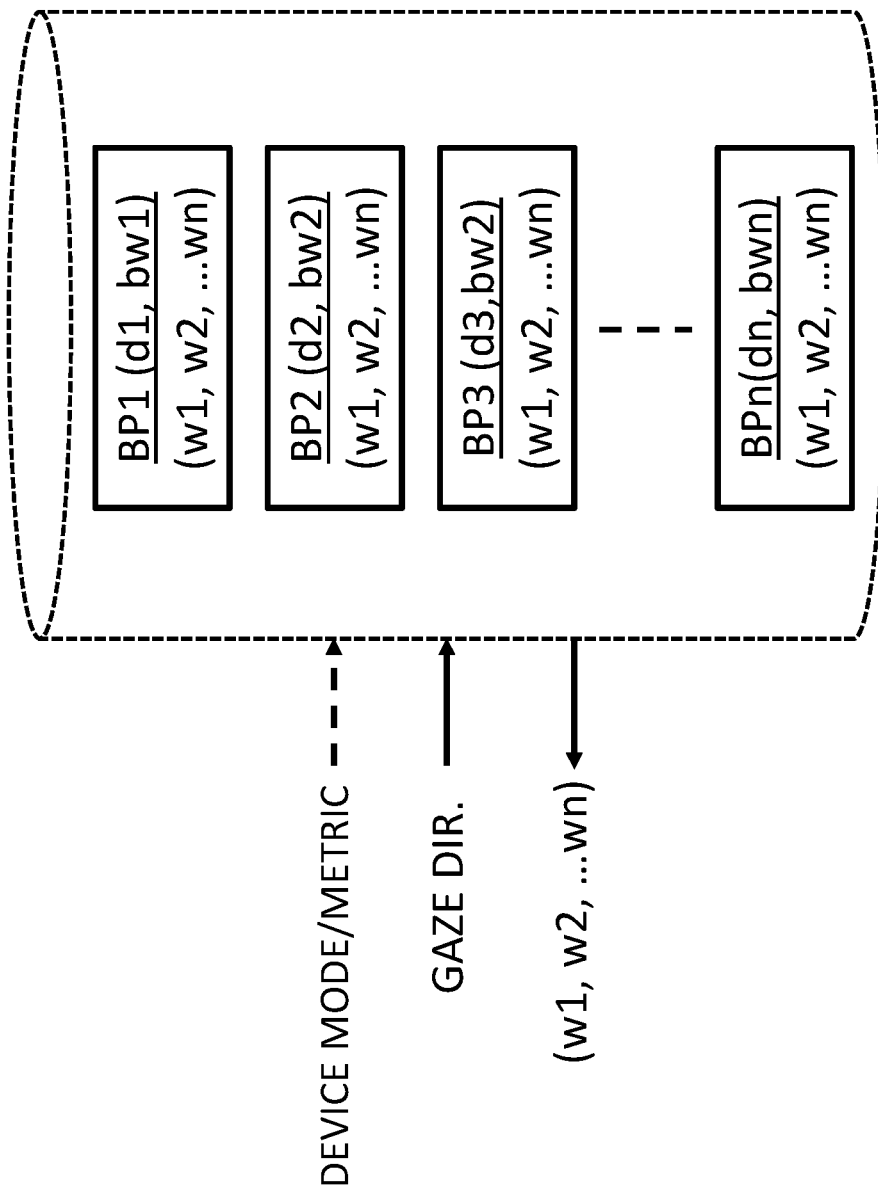
FIG. 8 illustrates retrieving a beam pattern from a database based on a gaze according to an implementation of the present disclosure.

FIG. 8 illustrates selecting and retrieving a beam pattern from a database based on a gaze according to an implementation of the present disclosure. The database, or look-up table, may be queried using the gaze direction to return a set of weights (w1, w2, ... wn) to provide a beam at (or close to) the gaze direction. As shown, the database includes a plurality of beam patterns (BP1, BP2, BP3, BPn), in a plurality of directions (d1, d2, d3, ... dn), each having a beam width (bw1, bw2, bw3, ... bwn).

The returned set of weights (w1, w2, ... wn), may each have a corresponding microphone. A beam width of a beam pattern may correspond to the number of microphones in an array. Accordingly, the stored beam patterns may include different numbers of weights to provide different beamwidths. For example, two beam patterns having the same direction but having different beamwidths may have a different number of weights. Alternatively, two beam patterns having the same direction but having different beam widths may have the same number of weights, but one of the beam patterns may include zero values for some of the weights. A zero value weight may effectively turn OFF the microphone corresponding to the weight.

Optionally, the selection (query) of the beam pattern database, or look-up table, may further include a device mode/metric. For example, a device may have different possible microphone configurations and the selection may be based on the particular microphone configuration of the device. In particular, the device mode/metric may cause only beam patterns in a horizontal direction to be selected.

Alternatively, some microphones may be deactivated (e.g., based on a power condition). This deactivation may cause a device mode/metric to select only beam patterns having a beam width (i.e., number of weights) corresponding to the number of active microphones. More details regarding the selection of a beam pattern based on a gaze direction will be discussed further below (e.g., see FIG. 9).

Returning to FIG. 7, after the beam pattern is selected 735, the method 700 further includes generating 740 beamformed audio based on the selected beam pattern and presenting 745 the beamformed audio to the user. The generation of the beamformed audio may be carried out as describe previously (e.g., see FIG. 5). For example, generating the beamformed audio signal based on the selected beam pattern can include retrieving a set of weights corresponding to the selected beam pattern. Then, applying each audio channel to a corresponding weight from the set of weights to generate weighted audio channels, which are summed to generate the beamformed audio signal.

Figure 9:
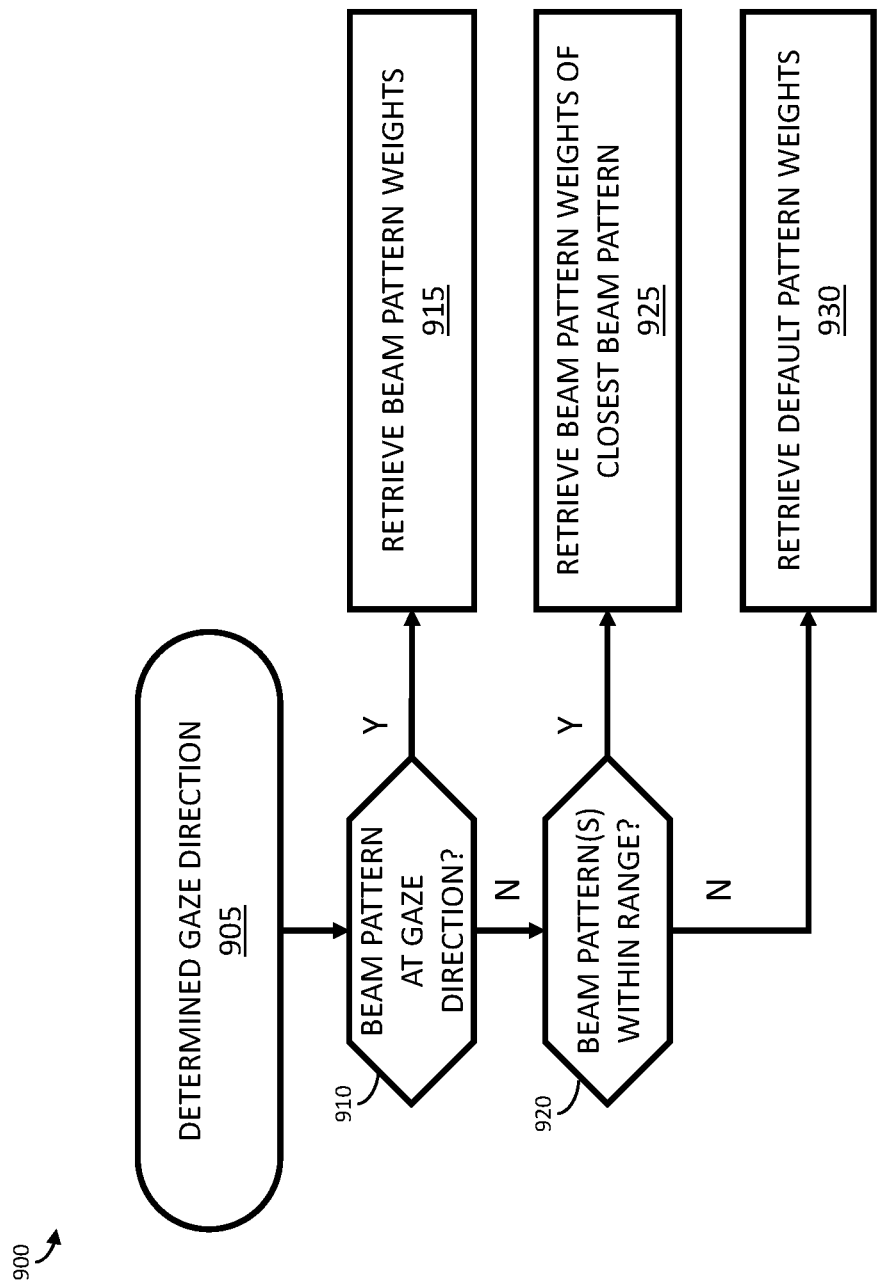
FIG. 9 is a flowchart of a method for selecting a beam pattern from a database based on a gaze according to an implementation of the present disclosure.

FIG. 9 is a flowchart of a method for selecting (i.e., retrieving) a beam pattern from the database of FIG. 8 based on a gaze according to an implementation of the present disclosure. The method 900 includes comparing the determined gaze direction 905 to beam directions of the stored set of beam patterns. If a beam pattern is found 910 at the gaze direction, then the weights for that beam pattern may be retrieved 915 and used to generate the beamformed audio (e.g., see FIG. 5). If no beam pattern is found at the gaze direction, then the search of the database (or look-up table) can be expanded to include beam patterns in directions that are within a range of angles around the gaze direction (e.g., ±10 degrees). If multiple beam patterns are found within the range 920, then the beam pattern having a direction that is closest to the gaze direction may be selected. The weights of the closest beam pattern may be retrieved 925 and used for beamforming. The closest weights may result in a mismatch between the beam and the object of interest, but the resulting beamforming may still provide enhanced (i.e., amplified) audio from the object of interest because the object of interest may still be within the beamwidth of the beam (e.g., see FIG. 1). If no beam patterns are found at the gaze direction and no beam patterns are found in a range of directions around the gaze direction, then a default between pattern may be retrieved 930 and used for beamforming. The default beam pattern may have weights to steer a beam to a direction (e.g., z direction) in front of the user (e.g., at 0 degrees azimuth and 0 degrees elevation with respect to the AR glasses coordinate system 430). Alternatively, the default pattern may include weight values of zero for all but one or two (e.g., stereo L/R) of the microphones in the array. The zero weight values may effectively disable their corresponding microphones (e.g., see FIG. 5), while the non-zero weight values may have a unity gain and no phase shift. In one possible implementation, a default pattern may enable a left microphone and a right microphone to operate as a stereo pair of microphones with no phase shift other than the interaural delay caused by their spacing on the AR glasses. In another possible implementation a default pattern may average the audio from the microphones by applying an equal weight (e.g., 1) to each channel.

Figure 10:
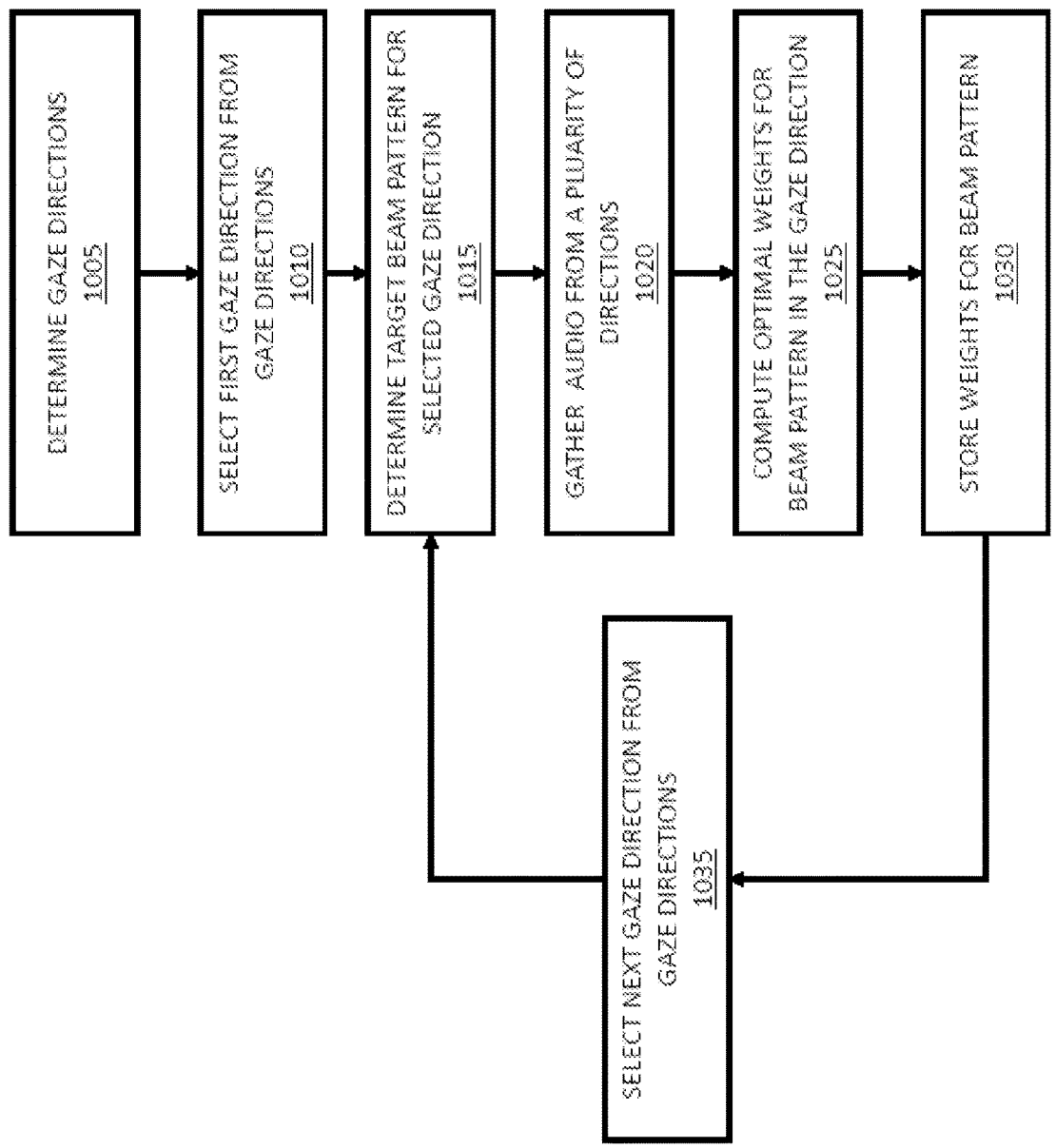
FIG. 10 illustrates a flowchart of a method for generating beam patterns according to an implementation of the present disclosure.

The stored beam patterns may be generated based on training that occurs before (i.e., offline) the beamforming is used in operation (i.e., online, runtime). FIG. 10 illustrates a flowchart of a method for generating beam patterns according to an implementation of the present disclosure. The method includes determining 1005 gaze directions.

Gaze directions may be determined based on their popularity over time. The popular gaze directions may be based on gazes monitored for one or more users over time. For example, the eyes of a user may be tracked over time to determine probabilities of various gaze directions or gaze points (e.g., see FIG. 2). For example, a gaze point may be determined when the gaze persists at the gaze point for more than a period of time. A probability map of gaze points may be generated based on gaze points gathered over a training period. For example, each possible gaze point (x,y) may have a number of gazes collected over the training period. The probability (i.e., likelihood) of that gaze point may be the number of gazes for the gaze point collected over the training period divided by the total gazes detected during the training period. The probability map may be implemented as a heat map image where the intensity of gaze points having a high popularity is higher than gaze points having a low popularity. The probability map may be analyzed to determine a set of gaze directions. For example, one or more gaze points (i.e., pixels) in an area of the heat map having intensities higher than a threshold may be highlighted (i.e., selected) as popular gaze points and a gaze direction towards the popular gaze points may be determined.

The method further includes selecting 1010 a first gaze direction from the (set of) gaze directions. A target beam pattern may be determined 1015 for the selected gaze direction. Determining the target beam pattern may include determining a beam width suitable for the particular gaze direction. For example, a large beam width may be selected so that a single beam pattern can provide coverage of a range of popular gaze directions (i.e., an area of popular gaze points). Once the target beam pattern has been selected, then the weights for that beam pattern may be computed. Computing the weights may include gathering 1020 audio from a plurality of directions and optimizing the following equation according to a least squares optimization process.

$$\text{minimize} \|y - Xw\|^2 \qquad (2)$$

In the equation above y is the target beam pattern (e.g., two-dimensional matrix having sensitivity values corresponding to the beam pattern), X is the audio from the plurality of angles (e.g., data matrix that is full-rank and pseudo-invertible), and w are the weights that being solved for (e.g., a vector of weights corresponding to the number of audio channels). The inversion to learn the weights for a particular gaze direction may be possible when the forward matrix (X) is full-rank.

A practical (offline) setup for gathering the audio may include moving a sound source around a pair of AR glasses while the audio from each channel is recorded so that the same audio data from a sound source may be collected at various angles. The optimization may then attempt various weights for each channel until the audio has a spatial sensitivity pattern that corresponds to the spatial sensitivity pattern of the target beam pattern. What results is a set of weights that approximates the target beam pattern. A quality of the approximation may be based on the number of weights (i.e., microphones). For example, increasing the number of weights may provide a better match of a target beam pattern so that the least squares optimization process is minimized closer to zero.

Returning to FIG. 10, after the optimal weights for a target beam pattern are computed 1025, they may be stored 1030 in the database (or lookup table). The weights may be indexed in the database by their corresponding beam direction and/or beam width. This method may be repeated for other gaze directions by selecting 1035 the next gaze direction from the gaze directions, determining a target beam pattern for the next gaze direction, and repeating the optimization process to compute/store weights for the next beam pattern in the database. After all beam patterns for all the determined gaze directions are stored in the database they may be downloaded to a local memory on the AR glasses or stored on a cloud memory that is accessible to the AR glasses online.

The stored beam pattern and look-up approach for beamforming is very computationally efficient, power efficient, and fast because the optimization does not need to be performed by the AR glasses while they are used by a user (i.e., at runtime). At runtime, beamforming can be performed simply by recalling weights from the database. The weights may not provide a beam pattern that is perfectly aligned with a user's gaze but can, in many cases, provide sufficient enhancement of the audio to help a user better hear the gaze target.

Figure 11:
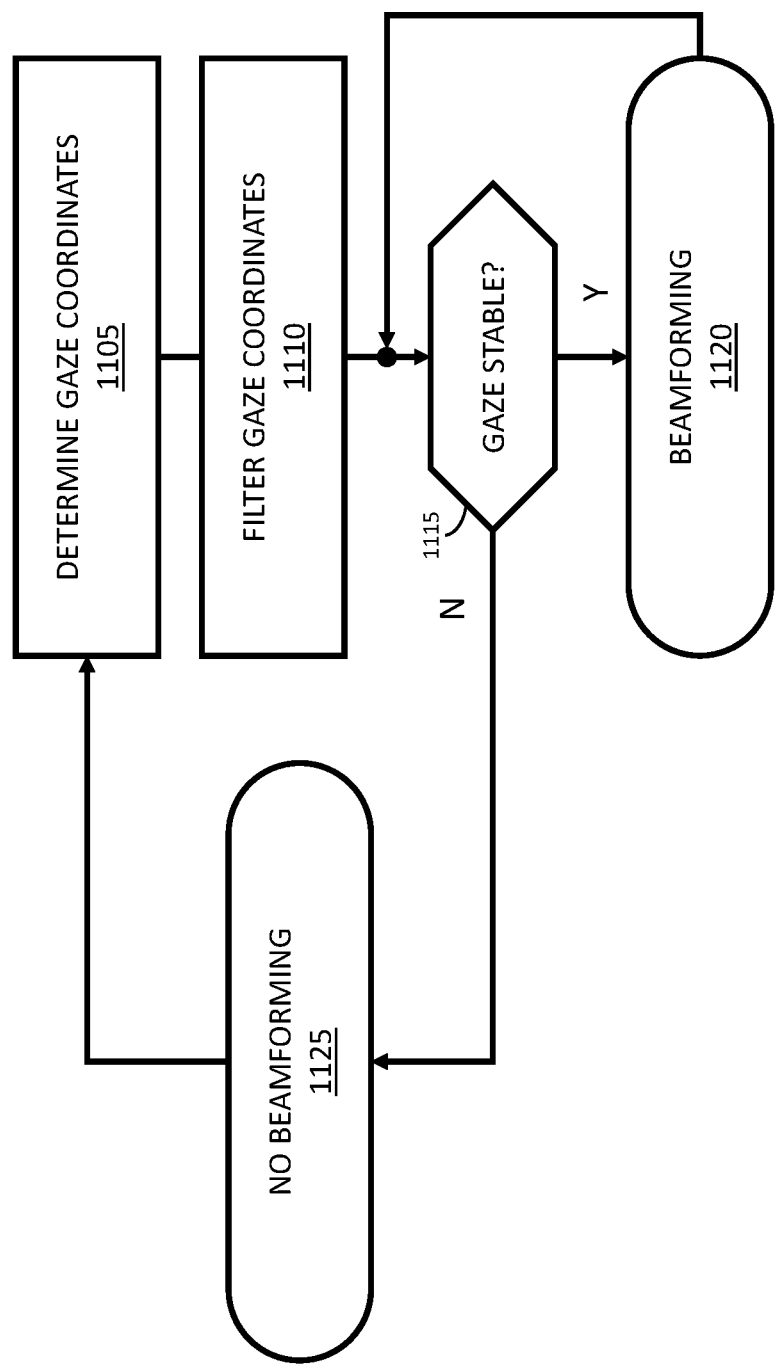
FIG. 11 illustrates a flowchart for detecting a gaze for beamforming according to an implementation of the present disclosure.

Determining when a user's gaze is fixed on a gaze point can be used offline (e.g., in the training described above) and/or online to determine when beamforming should be performed (e.g., FIG. 7 item 720). FIG. 11 illustrates a flowchart for detecting a gaze for beamforming according to an implementation of the present disclosure. The method includes determining 1105 a gaze point (i.e., gaze coordinates) (x,y). Rapid eye movements (i.e., saccades) may make determining a gaze difficult. Accordingly, the method further includes filtering 1110 the gaze coordinates in time. For example, the gaze coordinates from real-time eye tracking may be low-pass filtered in order to produce a time varying signal corresponding to gaze that varies less with time. In a possible implementation, eye tracking coordinates may be measured over time and average to obtain averaged eye tracking coordinates. The gaze direction of a user can be determined when the average eye tracking coordinates meet a criterion for a dwell time. For example, averaged eye tracking coordinates within a range (e.g., area) for longer than a threshold period can indicate a stable gaze. Beamforming may be determined based on the stability of the gaze. For example, when a gaze is stable 1115 then beamforming may be executed in a direction corresponding to a gaze determined from the filtered gaze coordinates. in a direction corresponding to the averaged eye tracking coordinates may be concluded. A stable gaze 1115 may trigger AR glasses to enter a beamforming mode 1120, while a gaze that is not stable (i.e., unstable gaze) may not trigger beam forming (i.e., no beamforming 1125). For example, in a possible implementation, AR glasses may not be configured in a beamforming mode unless a stable gaze is detected.

The computational efficiency, power efficiency, and speed of the stored beam pattern and look-up approach can allow for new beamforming applications. For example, beamforming may be gradually focused (zoomed in) or defocused (zoomed out) in a direction. In other words, the beamforming may be modified over time. Instead of the beamforming being activated ON/OFF, like a switch, zooming the beamforming corresponds to increasing/decreasing the beamforming over time to create an "audio zoom" experience of the object the user is visually focusing on. Combined with the previously mentioned dwell time gaze detection, gradual beamforming (i.e., zooming the beamforming) could enable a smoother audio transition IN/OUT of beamforming.

Figure 12:
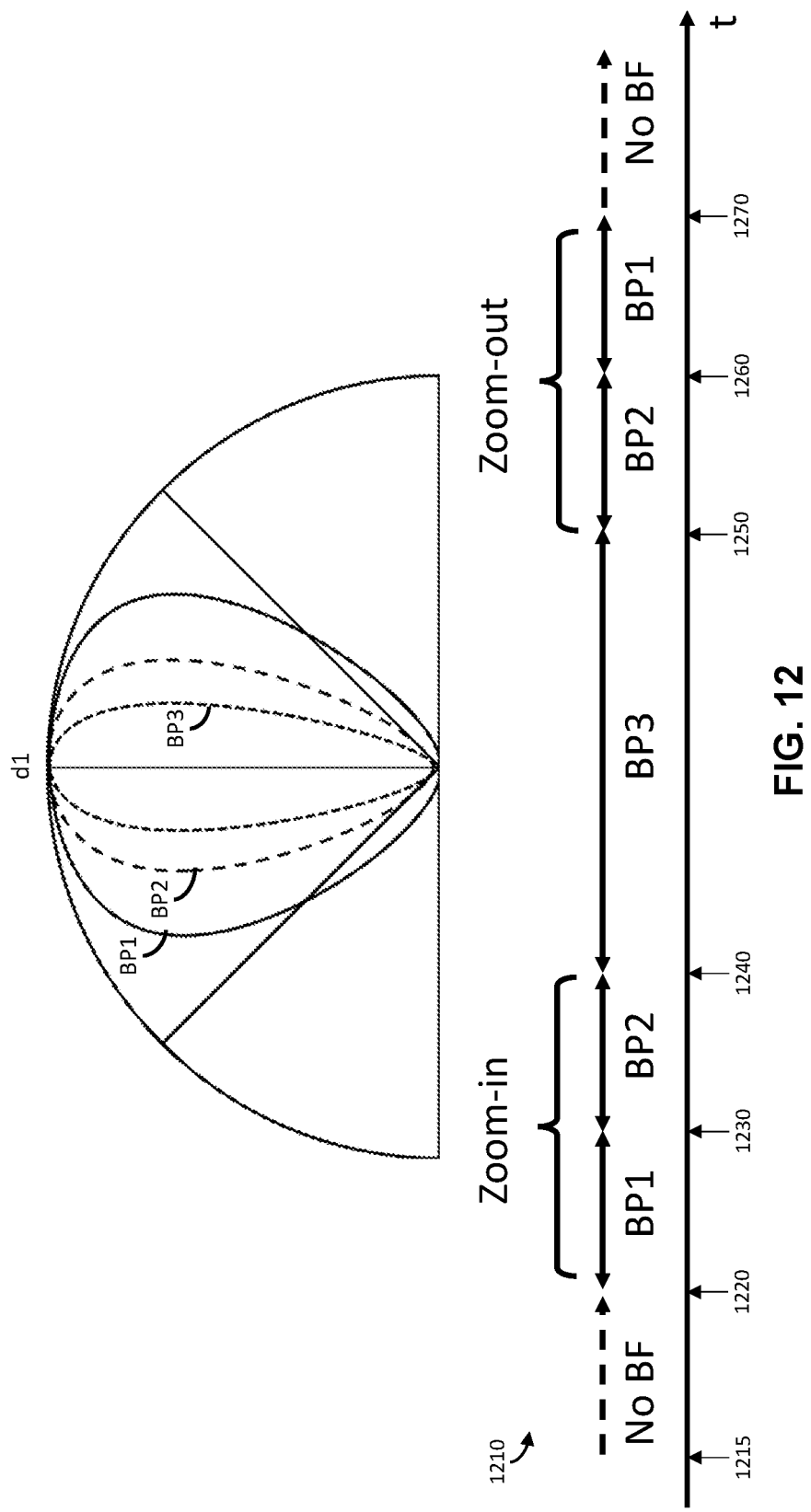
FIG. 12 illustrates zooming-in and zooming-out of beamforming according to an implementation of the present disclosure.

FIG. 12 illustrates zooming-in and zooming-out of beamforming according to an implementation of the present disclosure. The figure illustrates three beam patterns. A first beam pattern (BP1) has a first beam width, a second beam pattern (BP2) has a second beam width that is smaller than the first beam width, and a third beam pattern (BP3) has a beam width that is smaller than the second beam width. The first beam pattern (BP1), the second beam pattern (BP2), and the third beam pattern (BP3) are in the same direction (d1). The beam patterns can be stored in the database and applied in sequence (i.e., one at a time) to gradually change (i.e., zoom-in or zoom-out) the beamforming.

FIG. 12 includes a time graph 1210 of possible zoom-in and zoom-out sequences shown below the beam patterns. At a first time 1215, the audio is presented to the user without beamforming (i.e., No BF). Beamforming is triggered at a second time 1220. When beamforming is triggered (e.g., by a persistent gaze) the beamforming may be zoomed-in by applying a sequence to transition from no beamforming to fully beamformed. FIG. 12 shows one possible sequence. In the sequence, at the second time 1220, the first beam pattern (BP1) is retrieved (e.g., from the database) and applied to the audio channels. Then, at a third time 1230, the second beam pattern (BP2) is retrieved and applied to the audio channels. Then, at a fourth time 1240, the third beam pattern (BP3) is retrieved and applied to the audio channels. At the fourth time 1240, the beamforming is fully ON and can remain in this state based on the gaze of the user. At a fifth time 1250 beamforming ends (e.g., a user's gaze changes). At the fifth time 1250, the beamforming may be zoomed-out by transitioning from the third beam pattern (BP3), to the second beam pattern (BP2) at the fifth time 1250. Then, at a sixth time 1260, the beamforming transitions from the second beam patter (BP2) to the first beam pattern (BP1). Finally, at a seventh time 1270, the beamforming transitions back to no beamforming (No BF). The times and beamwidths of the sequence may be adjustable (e.g., by a user). Additionally, some sequences may include more (or fewer) beam patterns.

Unless defined otherwise, all technical and scientific terms used herein have the same meaning as commonly understood by one of ordinary skill in the art. Methods and materials similar or equivalent to those described herein can be used in the practice or testing of the present disclosure. As used in the specification, and in the appended claims, the singular forms "a," "an," "the" include plural referents unless the context clearly dictates otherwise. The term "comprising" and variations thereof as used herein is used synonymously with the term "including" and variations thereof and are open, non-limiting terms. The terms "optional" or "optionally" used herein mean that the subsequently described feature, event or circumstance may or may not occur, and that the description includes instances where said feature, event or circumstance occurs and instances where it does not. Ranges may be expressed herein as from "about" one particular value, and/or to "about" another particular value. When such a range is expressed, an aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

It will be understood that, in the foregoing description, when an element is referred to as being on, connected to, electrically connected to, coupled to, or electrically coupled to another element, it may be directly on, connected or coupled to the other element, or one or more intervening elements may be present. In contrast, when an element is referred to as being directly on, directly connected to or directly coupled to another element, there are no intervening elements present. Although the terms directly on, directly connected to, or directly coupled to may not be used throughout the detailed description, elements that are shown as being directly on, directly connected or directly coupled can be referred to as such. The claims of the application, if any, may be amended to recite exemplary relationships described in the specification or shown in the figures.

As used in this specification, a singular form may, unless definitely indicating a particular case in terms of the context, include a plural form. Spatially relative terms (e.g., over, above, upper, under, beneath, below, lower, and so forth) are intended to encompass different orientations of the device in use or operation in addition to the orientation depicted in the figures. In some implementations, the relative terms above and below can, respectively, include vertically above and vertically below. In some implementations, the term adjacent can include laterally adjacent to or horizontally adjacent to.

The invention claimed is:

1. A method comprising:
   receiving audio channels from a plurality of microphones of an augmented reality (AR) device, the plurality of microphones configured to operate as a microphone array;
   tracking an eye of a user of the AR device to determine a gaze direction of the user;
   selecting a beam pattern for the microphone array, the beam pattern selected from a set of stored beam patterns based on the gaze direction of the user;
   generating a beamformed audio signal based on the selected beam pattern; and
   transmitting the beamformed audio signal to speakers of the AR device for playing the beamformed audio signal to the user.

2. The method according to claim 1, wherein generating the beamformed audio signal based on the selected beam pattern includes:
   retrieving a set of weights corresponding to the selected beam pattern;
   applying each audio channel to a corresponding weight from the set of weights to generate weighted audio channels; and
   summing the weighted audio channels to generate the beamformed audio signal that amplifies sounds according to the beam pattern.

3. The method according to claim 1, wherein each beam pattern in the set of stored beam patterns has a beam direction and a beam width.

4. The method according to claim 3, wherein selecting the beam pattern from the set of stored beam patterns based on the gaze direction of the user includes:
   comparing the gaze direction to the beam direction of each beam pattern in the set of stored beam patterns; and
   retrieving a beam pattern from the set of stored beam patterns having a beam direction that is closest to the gaze direction.

5. The method according to claim 4, further comprising:
   when multiple beam patterns have the beam direction that is closest to the gaze direction, selecting the beam pattern from the set of stored beam patterns based on the beam width.

6. The method according to claim 5, further comprising:
   determining a power condition of the AR device; and
   selecting a beam pattern with a beam width based on the power condition.

7. The method according to claim 5, further comprising:
   zooming-in the beam pattern at the gaze direction by generating beamformed audio signals based on a sequence of selected beam patterns having the beam direction, each successive beam pattern in the sequence having a smaller beam width.

8. The method according to claim 5, further comprising:
   zooming-out the beam pattern at the gaze direction by generating beamformed audio signals based on a sequence of selected beam patterns having the beam direction, each successive beam pattern in the sequence having a larger beam width.

9. The method according to claim 1, wherein transmitting the beamformed audio signal to speakers of the AR device for playing to the user includes:
   dividing the beamformed audio signal into a left channel and a right channel; and
   adjusting a phase and amplitude difference between the left channel and the right channel based on the gaze direction of the user.

10. The method according to claim 1 further comprising:
    determining a target beam pattern based on a training experiment;
    calculating weights for a beam pattern that approximates the target beam pattern;
    storing the weights for the beam pattern in a memory as a first beam pattern having a first gaze direction and a first beam width; and
    repeating the determining, the calculating, and the storing for other target beam patterns to generate the set of stored beam patterns.

11. The method according to claim 10, wherein the training experiment includes likelihoods of gaze directions.

12. The method according to claim 10, wherein the calculating weights for a beam pattern that approximates the target beam pattern includes:
    performing a least-squares optimization.

13. The method according to claim 1, wherein tracking an eye of a user of the AR device to determine a gaze direction of the user includes:
    measuring eye tracking coordinates over time;
    averaging the eye tracking coordinates over time to obtain averaged eye tracking coordinates; and
    determining the gaze direction of the user based on the averaged eye tracking coordinates when the averaged eye tracking coordinates are within a range of each other for a dwell time.

14. The method according to claim 13, further comprising:
    obtaining an image of a field of view of the user;
    analyzing the image in an area based on the gaze direction;

confirming the gaze direction based on the analysis; and
triggering beam forming when the gaze direction is confirmed, the beam forming including the selecting a beam pattern from a set of stored beam patterns based on the gazed direction of the user.

15. Smart glasses comprising:
a microphone array including microphones, the microphones configured to generate channels of audio based on sounds from an environment;
an eye tracker configured to determine a gaze direction of a user;
speakers; and
a processor configured by software to:
   receive the channels of audio from the microphone array;
   receive the gaze direction from the eye tracker;
   retrieve weights for the channels of audio from a look-up table based on the gaze direction;
   apply the weights to the channels and sum the channels to generate a beamformed audio signal that amplifies sounds in the environment from the gaze direction; and
   transmit the beamformed audio signal to the speakers for playing to the user.

16. The smart glasses according to claim 15, wherein to retrieve the weights for the channels of audio from the look-up table, the processor is further configured to:
   access the look-up table that includes sets of weights for a plurality of predetermined-gaze directions; and
   select weights for one predetermined-gaze direction that is closest to the gaze direction.

17. The smart glasses according to claim 16, wherein the plurality of predetermined-gaze directions are based on likelihoods of gaze directions determined by a training process.

18. The smart glasses according to claim 16, wherein the look-up table is stored on the smart glasses.

19. The smart glasses according to claim 16, wherein the look-up table is stored on a network coupled to the smart glasses.

20. The smart glasses according to claim 15, wherein the microphone array includes a vertical-array that generates vertical channels of audio and a horizontal-array that generates horizontal channels of audio.

21. The smart glasses according to claim 20, wherein the gaze direction includes a horizontal gaze direction and a vertical gaze direction and the processor is configured to determine horizontal weights for the horizontal channels of audio based on the horizontal gaze direction and vertical weights for the vertical channels of audio based on the vertical gaze direction.

* * * * *